(12) United States Patent
Stichter

(10) Patent No.: US 7,068,746 B1
(45) Date of Patent: Jun. 27, 2006

(54) BASE STATION TRANSCEIVER TO RADIO NETWORK CONTROLLER SYNCHRONIZATION FILTERING FUNCTION

(75) Inventor: Allen W. Stichter, Flemington, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/516,195

(22) Filed: Mar. 1, 2000

(51) Int. Cl.
*H04L 7/00* (2006.01)

(52) U.S. Cl. ............... 375/356; 375/357; 375/358; 375/359

(58) Field of Classification Search ............ 375/220, 375/221, 354, 222, 355, 356, 357, 358; 370/503, 370/516, 517
See application file for complete search history.

(56) References Cited

U.S. PATENT DOCUMENTS

| | | | |
|---|---|---|---|
| 4,807,259 A | | 2/1989 | Teraji et al. |
| 5,388,102 A | * | 2/1995 | Griffith et al. ............ 370/512 |
| 5,530,704 A | | 6/1996 | Gibbons et al. |
| 5,613,211 A | | 3/1997 | Matsuno |
| 5,809,426 A | | 9/1998 | Radojevic et al. |
| 5,872,774 A | | 2/1999 | Wheatley, III et al. |
| 5,930,722 A | * | 7/1999 | Han et al. ............... 455/502 |
| 6,154,642 A | * | 11/2000 | Dumont et al. ........... 455/403 |
| 6,199,169 B1 | * | 3/2001 | Voth ......................... 713/400 |
| 6,236,623 B1 | * | 5/2001 | Read et al. ................. 368/46 |
| 6,373,834 B1 | * | 4/2002 | Lundh et al. .............. 370/350 |

FOREIGN PATENT DOCUMENTS

WO  WO 99/33207  7/1999

* cited by examiner

*Primary Examiner*—Jean B. Corrielus
*Assistant Examiner*—Qutub Ghulamali

(57) ABSTRACT

A method for synchronizing communications in a wireless communications network wherein time synchronization is performed between a clock master and a clock slave. To achieve synchronization between the clock master and the clock slave, several time synchronization passes are initiated by the clock slave to the clock master. For every pass, each clock slave component generates and transmits a first timing cell containing a transmission time based on the clock slave's component clock, to the clock master. Upon receipt of the first timing cell, the clock master generates and transmits to the clock slave component a second timing cell containing the time the clock master received the first timing cell and the time the clock master transmitted the second timing cell. Upon receipt of the second timing cell, the clock slave component will obtain its reception time and calculate a transmission delay based on the reception time and the timing information contained in the timing cells.

31 Claims, 6 Drawing Sheets

BASE STATION TRANSCEIVER TO RADIO NETWORK CONTROLLER SYNCHRONIZATION FILTERING FUNCTION

BACKGROUND OF THE INVENTION

1. Field of the Invention

The present invention relates generally to the field of telecommunications and, more particularly, to an accurate time synchronization method having a filtering function for a wireless telecommunications system.

2. Description of the Related Art

FIG. 1 illustrates a schematic diagram of a portion of a typical wireless telecommunications system 100. The system 100 provides wireless communication service to a number of wireless terminals 101-1, 101-2, 101-3 that are situated within a graphical region. The heart of a typical wireless telecommunications system 100 is the Radio Network Controller (RNC) 120, which may also be known as a Mobile Switching Center (MSC) or Mobile Telephone Switching Office (MTSO). Typically, the RNC 120 is connected to a plurality of base station transceivers 103-1, 103-2, 103-3, 103-4, 103-5 that are dispersed throughout the geographic area serviced by the system 100 and to local-offices (L.O.) 130, 138 and toll offices (T.O.) 140. The RNC 120 is responsible for, among other things, establishing and maintaining calls between wireless terminals and between a wireless terminal and a wireline terminal 150, which is connected to the system through local and/or long distance networks.

The geographic area serviced by the system 100 is partitioned into a number of spatially distinct areas called "cells." In FIG. 1 each cell is schematically represented by a hexagon; in practice, however, each cell usually has an irregular shape that depends on the topology of the terrain serviced by the system 100. Typically, each cell contains a base station transceiver (BTS), such as for example BTS 103-1, which includes the radios and antennas that the BTS uses to communicate with the wireless terminals in that cell and also comprises the transmission equipment that the BTS uses to communicate with the RNC 120.

For example, when wireless terminal 101-1 desires to communicate with wireless terminal 101-2, wireless terminal 101-1 transmits the desired information to base station transceiver 103-1, which relays the information to RNC 120. Upon receipt of the information, and with the knowledge that the information is intended for wireless terminal 101-2, the RNC 120 returns the information back to base station transceiver 103-1, which relays the information to the wireless terminal 101-2.

Often times, telecommunications systems, such as the system 100 illustrated in FIG. 1, schedule events that are to take place at specified times. This means that each BTS 103-1, 103-2, 103-3, 103-4, 103-5 within the system 100 must have their time synchronized to each other and to the time of the RNC 120. This is a problem because the components of the system 100, with the exception of the clock master (typically the RNC 120 or an external component connected to the RNC 120), do not know what the actual system time is and, more importantly, they do not know the time of the other components within the system 100. Thus, in order for each component to have the same time as each other and the clock master, a time synchronization method is typically executed when the components of the system 100 are powered-on or reset.

Current time synchronization techniques usually involve distributing a time reference throughout the system via a time synchronization message. Typically, each component in the telecommunications system has a clock that ticks, but the ticks do not correlate to a system time without a clock base. The components within the system store this time reference and begin to use it as a clock base. If all of the components use the same base and their clocks all operate at the same rate, the components should have their time synchronized to each other.

This type of time synchronization technique is not without its shortcomings. For example, this technique does not account for delays that arise between the time the reference time was created by the clock master and the time the other components (i.e., clock slaves) within the system receive the time reference. Thus, the clock slave components will have a base time that differs from the master clock time. The difference between the component time and the master clock time is known in the art as a time error. It is desirable to keep the time error to a minimum to prevent errors within the system. In addition, there is usually a system specification requiring that the time error be kept to a minimum to guarantee customer satisfaction. Often times, however, this time error is very large because of processing delays experienced by the clock master or transmission delays. Moreover, the transmission delays experienced by each component may vary, which means that each component will have a different time error causing additional problems within the system. Accordingly, there is a need and desire for a method of accurately synchronizing the time between the components of a wireless telecommunications system.

SUMMARY OF THE INVENTION

The present invention provides a method of accurately synchronizing the time between the components of a wireless telecommunications system.

The present invention also provides a method of accurately synchronizing the time between the components of a wireless telecommunications system that also filters out undesirable synchronization data.

The above and other features and advantages of the invention are achieved by initiating several time synchronization passes between clock slave components and a clock master component in a wireless telecommunications system. For every pass, each clock slave component generates and transmits a first timing cell to the clock master. The first timing cell contains a transmission time based on the clock slave component's clock. Upon receipt of the first timing cell, the clock master generates and transmits to the clock slave component a second timing cell containing the time the clock master received the first timing cell and the time the master transmitted the second timing cell. Upon receipt of the second timing cell, the clock slave component will obtain its reception time and calculate a transmission delay based on the reception time and the timing information contained in the timing cells. Each clock slave component utilizes a sliding window filtering function to drop information from a synchronization pass that may have undesirable data due to processing and other delays. The filtering function will also restart the synchronization process whenever a calculated transmission delay is smaller than the best transmission delay. This allows the process to accurately hone in on the proper delay experienced between each clock slave component and the clock master. After timing information from a predetermined number of time synchronization passes has been obtained, each clock slave component uses an average transmission delay to synchronize its time to the clock master time.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF PREFERRED EMBODIMENTS

Another way to perform time synchronization would be to accumulate timing data samples from several time synchronization communications between the system clock master and the other components within the system (i.e., the clock slave components). Each data sample should represent a transmission delay experienced by the clock master and a slave component during the communication with each other. For example, when the clock master sends a message to a clock slave, the message is not received by the slave until after a transmission delay. If the delay where known, than the delay could be added to the transmitted clock master time to calculate the current clock master time. This would improve the accuracy of the time synchronization process. The transmission delay may vary from communication to communication. Thus, to get a better judge of the typical transmission delay experienced between the clock master and a clock slave, several samples are used and an average transmission delay is calculated. Each slave component then uses its computed average delay as a time offset during a final synchronization step which synchronizes its clock time to the master clock time. Once synchronized, the clock master and the clock slave components should all have the same system time plus or minus the timing error.

Although the timing error should be smaller than the timing errors of other synchronization techniques, this scheme will also be effected by processing delays. Large processing delays or other errors can cause bad timing data to be used in the average transmission delay calculation. The bad data samples will corrupt the calculated transmission delay and cause an improper offset to be applied in the final synchronization step. Accordingly, there is a desire and need for a method of accurately synchronizing the time between the components of a wireless telecommunications system that also filters out undesirable synchronization data.

Figure 1:
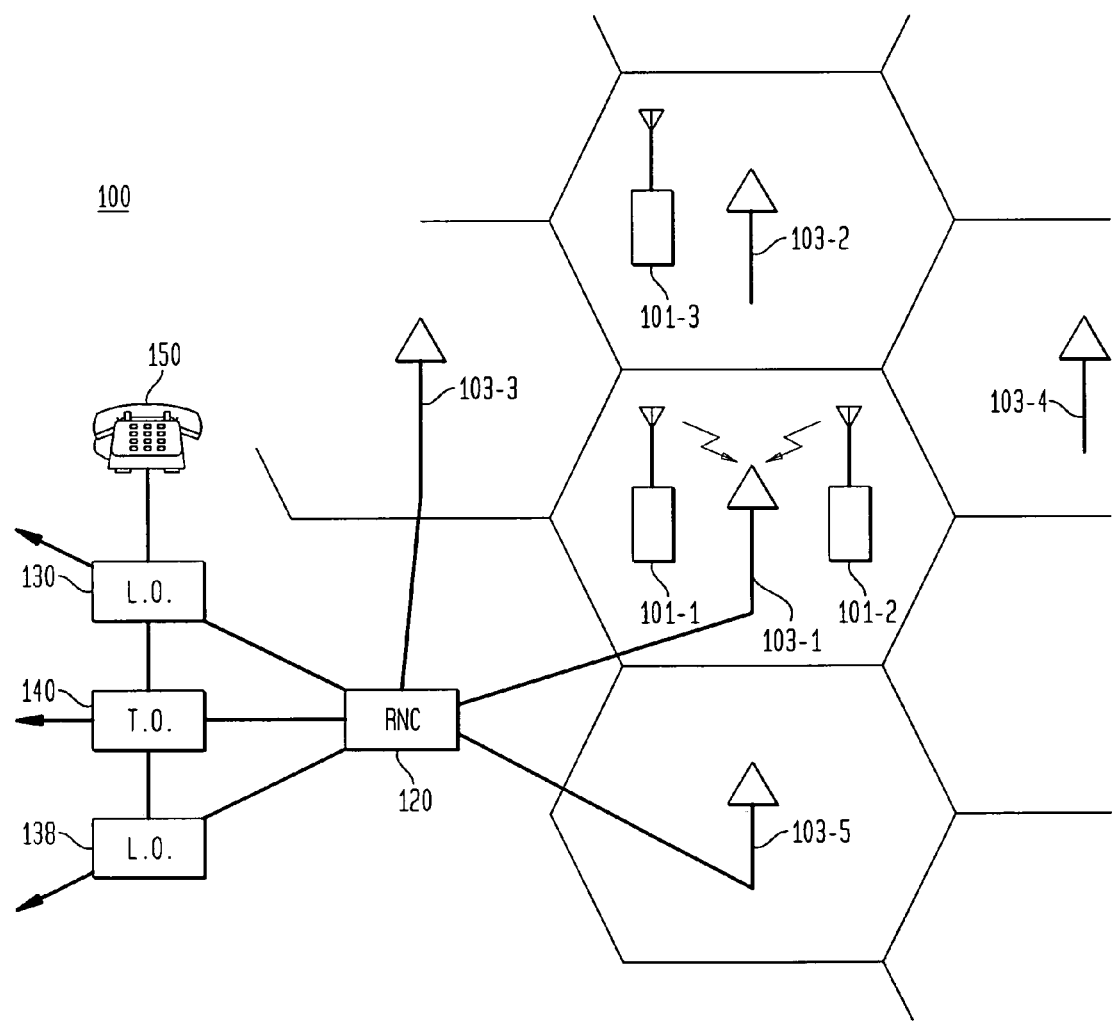
FIG. 1 is a schematic diagram illustrating a conventional wireless telecommunications system.

The present invention is implemented in software and is to be executed primarily within each base station transceiver of a CDMA system, such as the system 100 illustrated in FIG. 1. It is desirable that the CDMA system utilize an asynchronous transfer mode (ATM) network protocol or like communications protocol so that timing information can be transmitted between the RNC and base station transceivers. Using an ATM network protocol or like communications protocol allows clock information to be transmitted with each ATM message. In addition, each clock within the system operates at the same rate. Once the various clocks are synchronized by the present invention, all of the system components will have the same time plus or minus a minor timing error. The present invention is designed to reduce the timing error to about four hundred microseconds. For example purposes only, the RNC will be used as the clock master and the base station transceivers (BTSs) will be used as the clock slave components.

Figure 2:
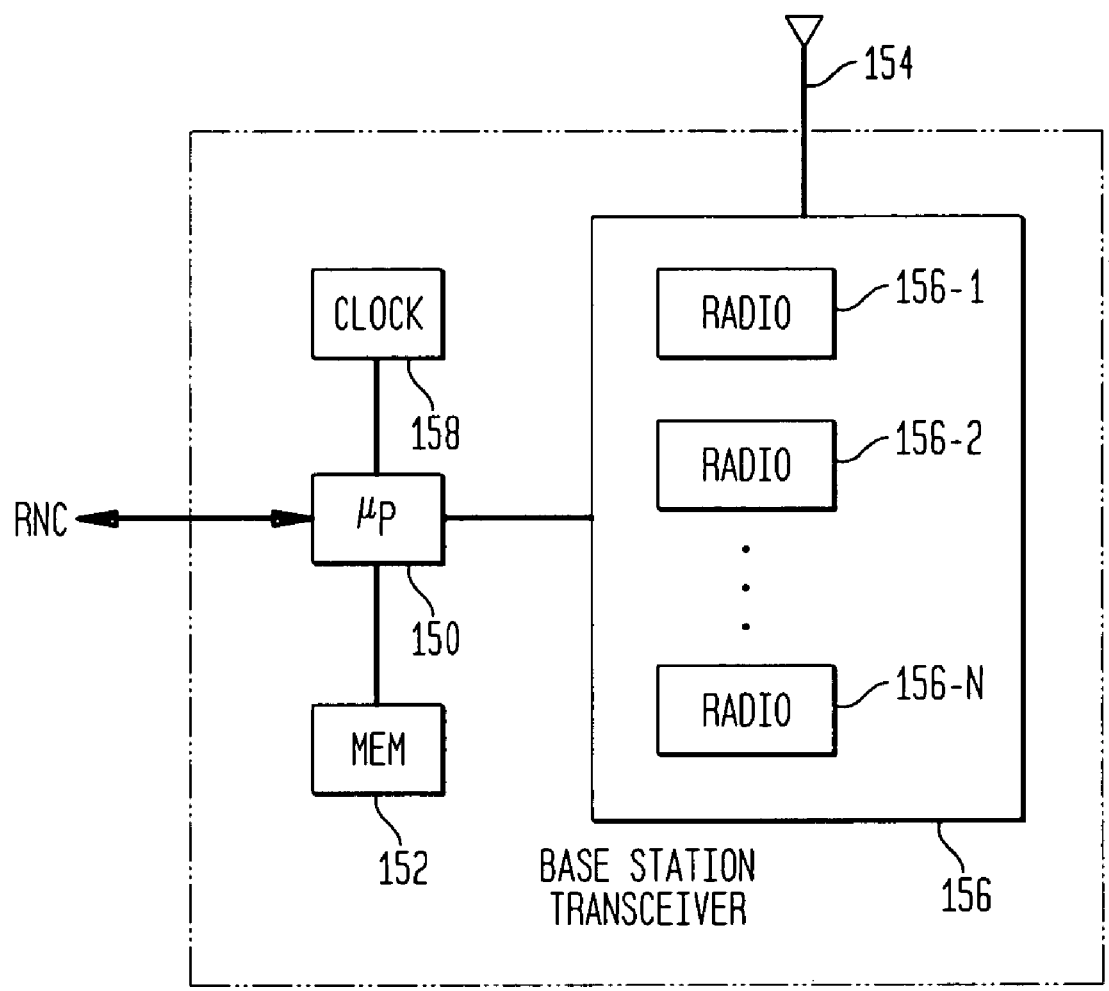
FIG. 2 is a block diagram illustrating an exemplary base station used in the wireless telecommunications system of the present invention.

FIG. 2 illustrates an exemplary BTS. The BTS includes at least one controller 150, memory circuit 152, antenna 154, radio module 156 and a clock 158 connected in the conventional manner. It should be appreciated that a BTS may contain numerous controllers, but only one controller 150 is illustrated. The controller 150 is preferably a programmed microprocessor. Although FIG. 2 illustrates the controller 150 as a microprocessor (i.e., "μp"), the controller 150 may be a digital signal processor or an application specific integrated circuit (ASIC). It is desirable that the controller 150 is a digital signal processor capable of being programmed to execute the method 200 (FIGS. 3a–3c) of the present invention. Similarly, the BTS may contain a controller 150 that includes an internal clock as opposed to the clock 158 illustrated in FIG. 2. Moreover, the exact architecture of the BTS is not important as along as it can implement the method of the present invention (discussed below). The radio module 156 contains a plurality of radios 156-1, 156-2 . . . 156-n. As known in the art, the controller 150 is coupled to the memory 152, radio module 156 and clock 158. The controller 150 is also in communication with the RNC. As is also known in the art, the controller 150 controls and coordinates the operations of the BTS including, but not limited to, the call processing and power control functions while also communicating with the RNC. With the provision of some additional software, the controller 150 will also implement the method 200 of the present invention (described below with reference to FIGS. 3a–3c).

Figure 3A:
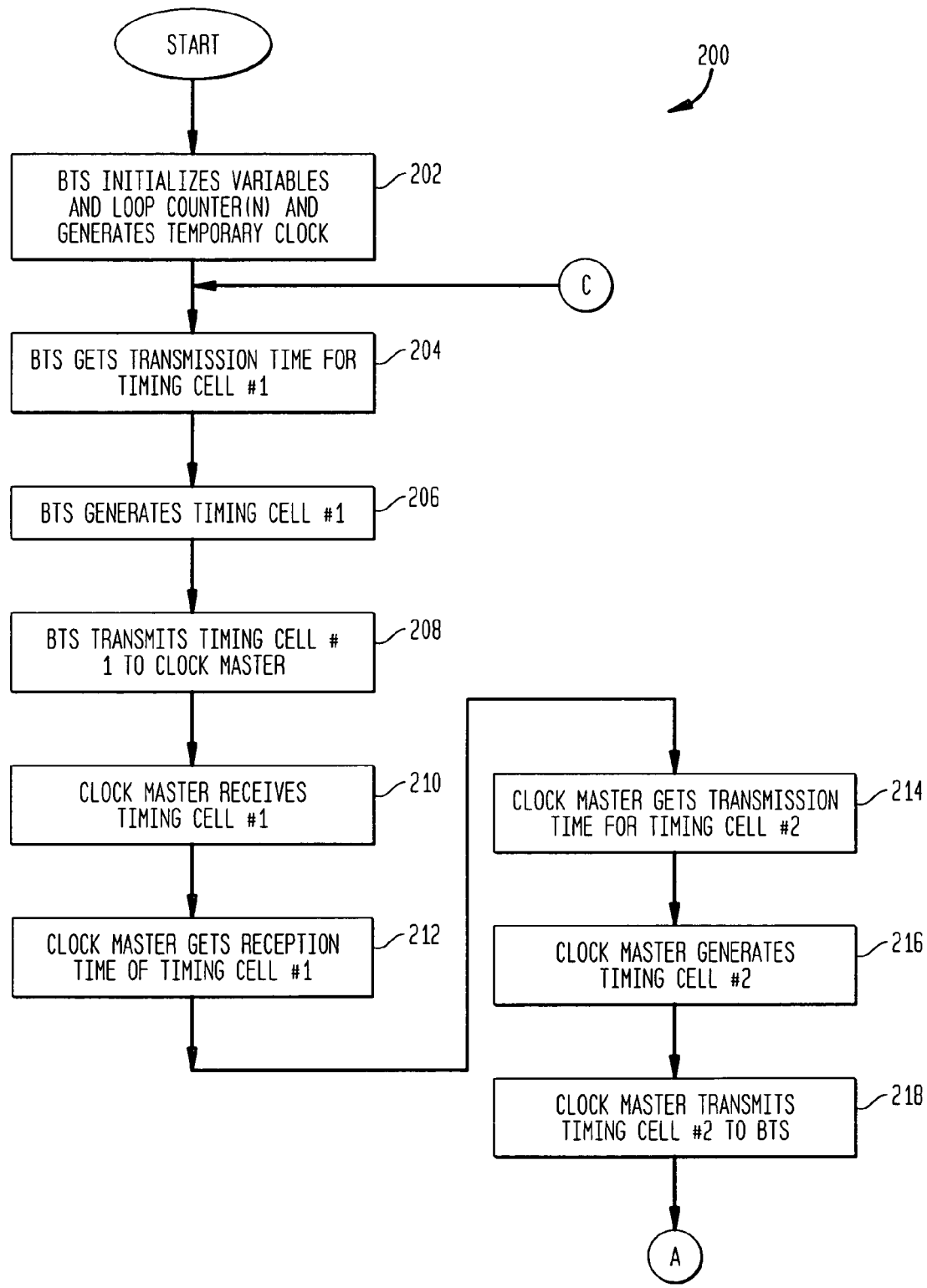
FIGS. 3a–3c illustrate in flow chart form an exemplary method of synchronizing the time between the components of a wireless telecommunications system that utilizes a filtering function in accordance with the present invention.
Figure 3B:
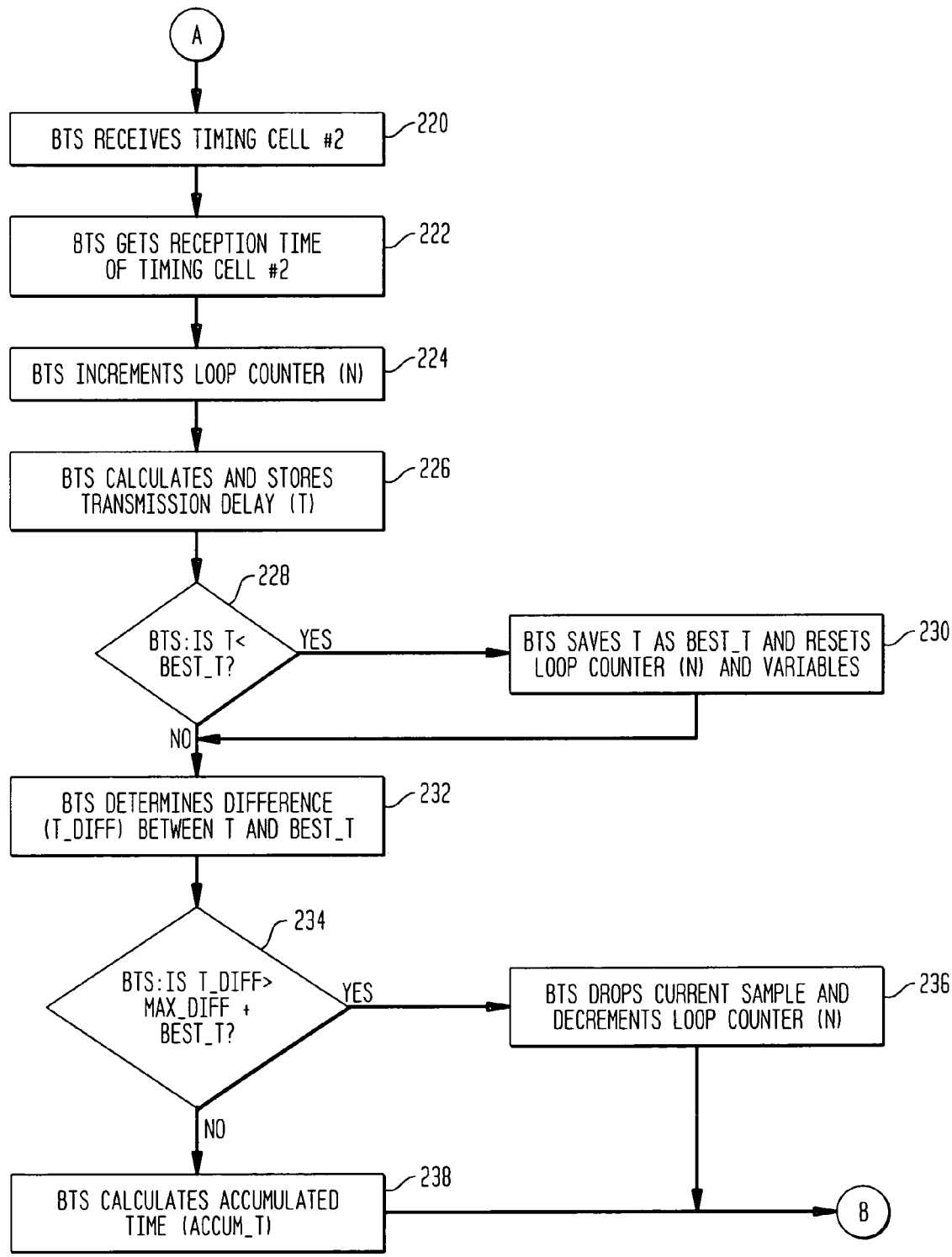
Figure 3C:
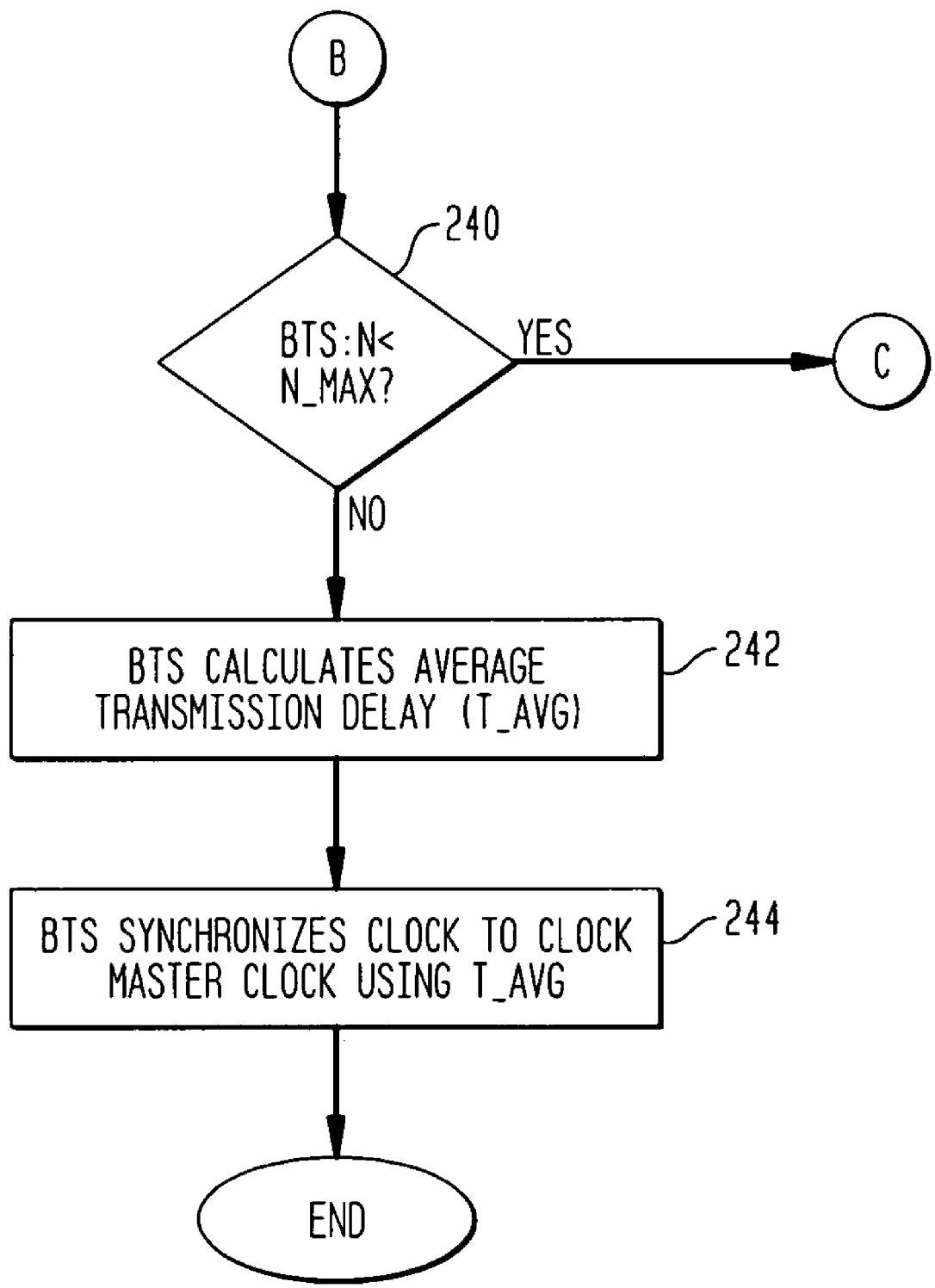

FIGS. 3a–3c illustrate an exemplary method 200 of synchronizing the time between the components of a wireless telecommunications system. As will be described below, the method 200 utilizes a sliding window filtering function to remove undesirable data caused by large processing delays or other errors. Removing the undesirable data prevents the synchronization process from being corrupted by the processing delays or other errors. Keeping with our example that the RNC is the clock master and each BTS in the system is a clock slave, the method 200 will be run on each BTS in the system (with the exception of steps 210 to 218, which are run by the RNC).

Initially, the method 200 begins when the BTS initializes any variables needed during the method 200 (step 202). In addition, the BTS will initialize a loop counter N, which will be used to determine the number of time synchronization iterations that have been performed. It is desirable to perform several time synchronization iterations to obtain a good estimate of the actual transmission delays between the BTS and RNC. Although any number of iterations can be used, the inventor has determined that approximately twenty iterations is sufficient to properly synchronize the time in the system. Thus, a maximum number of iterations counter N_MAX is used and should be set to twenty. It should be appreciated that the number of iterations could be dynamic and based on other conditions if so desired.

The number of iterations also indicates the number of data samples collected and is subsequently used to calculate the average transmission delay experienced by the BTS when it communicates with the RNC. The BTS will also generate a temporary clock that will be used as an initial time reference until the BTS has synchronized its time to the time of the RNC (i.e., the clock master). The generation of a temporary clock can usually be implemented in software and the exact manner in which it is performed will depend upon the software used to implement the method 200. It should be apparent that the exact manner in which the temporary clock is generated and maintained is not important and is application specific.

Figure 4:
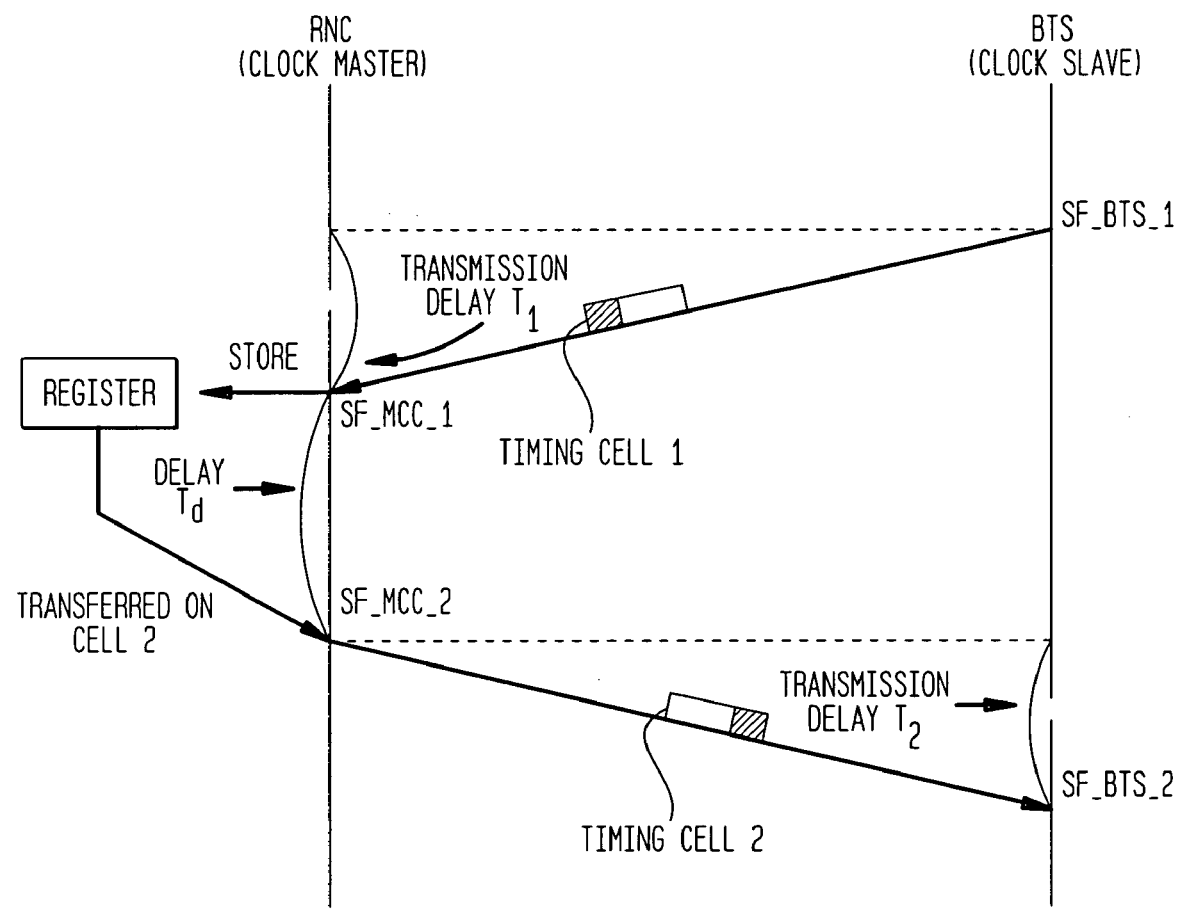
FIG. 4 illustrates the message transmission and timing information used by the method illustrated in FIG. 3.

At step 204, the BTS reads its clock to obtain a transmission time for a first timing cell (also referred to herein as "TIMING CELL #1") that is to be transmitted to the RNC. Referring to FIG. 4, it can be seen that the BTS will transmit TIMING CELL # 1 to the RNC at time SF_BTS_1. The transmission time SF_BTS_1 will be included in TIMING CELL #1. TIMING CELL # 1 is then received by the RNC (clock master) at time SF_MCC_1, which is a time generated by the RNC clock (clock master clock). Note that there is a first transmission delay $T_1$ from the time TIMING CELL # 1 is transmitted by the BTS to the time it is received by the RNC. It should be noted that at this point, the RNC clock and the BTS clock are not synchronized. After a minor processing delay Td, the RNC generates and transmits a second timing cell (also referred to herein as "TIMING CELL # 2") at time SF_MCC_2, which is also generated by the RNC clock. TIMING CELL# 2 will contain the SF_MCC_1 and SF_MCC_2 as well as the SF_BTS_1. TIMING CELL # 2 is received by the BTS at SF_BTS_2, a time generated by the BTS temporary clock, after a second transmission delay $T_2$. As will be described below, after several communications between the BTS and the RNC (referred to herein as "passes") all of this time information (SF_BTS_1, SF_MCC_1, SF_MCC_2 and SF_BTS_2) is used by the BTS to calculate an average communication delay between the BTS and the RNC. The average delay is subsequently used by the BTS to synchronize its temporary clock to the RNC clock (master clock).

Referring to FIGS. 3a–3c and FIG. 4, once the transmission time SF_BTS_1 is obtained in step 204, the BTS generates TIMING CELL # 1 (step 206). As noted earlier, TIMING CELL # will contain the transmission time SF_BTS_1 obtained in step 204. At step 208, the BTS transmits TIMING CELL # 1 to the RNC.

The following steps are performed by the RNC (clock master), which is programmed to receive TIMING CELL # 1 (step 210), format TIMING CELL # 2 (steps 212–216) and transmit TIMING CELL # 2 to the BTS (step 218). Thus, at step 210, the RNC receives TIMING CELL # 1. At step 212, the RNC obtains a reception time SF_MCC_1 of TIMING CELL # 1. The reception time SF_MCC_1 is a time generated by the RNC clock. At step 214, the RNC obtains a transmission time SF_MCC_2 for TIMING CELL # 2. This transmission time SF_MCC_2 is also generated using the RNC clock. At step 216 the RNC generates the second timing cell TIMING CELL # 2. TIMING CELL# 2 will contain the transmission and reception times SF_BTS_1 and SF_MCC_1 of TIMING CELL # 1 and the transmission time SF_MCC_2 of TIMING CELL # 2. At step 218, the RNC transmits TIMING CELL # 2 to the BTS.

The remaining steps of method 200 are performed by the BTS. At step 220, the BTS receives TIMING CELL # 2. Using its temporary clock, the BTS obtains a reception time SF_BTS_2 of TIMING CELL # 2 (step 222) and increments the iteration loop counter N (step 224). The BTS uses all of the timing information concerning the transmission and reception of the two timing cells to calculate the transmission delay T for the current communication between the BTS and RNC. The transmission delay T can be calculated as follows:

(1) T=(SF_BTS_2−SF_BTS_1−Td)/2, where Td is:
(2) Td=SF_MCC_2−SF_MCC_1.

Once the transmission delay T is calculated and stored (step 226), the method continues at step 228 where the first portion of the sliding window filtering function is executed. Why the filtering function is described as a sliding window will be described below. This portion of the filtering function attempts to determine if this transmission delay T is the "best" transmission delay BEST_T obtained during the method 200. The term "best" is used to indicate the smallest delay computed between the BTS and RNC during the current execution of the method 200. It is desirable that every time a new transmission delay T that is better than the BEST_T is obtained, that the new transmission delay T be stored and used as the BEST_T. It is also desirable for the method 200 to reset the number of time synchronization iterations and any accumulated transmission delay to zero. This way, the method 200 will perform the predetermined number of time synchronization iterations as if no data samples have been performed. This is desirable, since the transmission delay between the BTS and RNC appears to be getting better and is now beginning to settle into the typical delay. Thus, any information up to this point may not accurately reflect the typical transmission delay and should be discarded to prevent the time synchronization results from being corrupted.

If at step 228 it is determined that the transmission delay T is less than the best transmission delay BEST_T, then the method continues at step 230 where the BTS saves the transmission delay T as the best transmission delay BEST_T. At step 230 the BTS will also reset the iteration loop counter N and any variables used during the method 200 (except for BEST_T). After step 230 or if it is determined that the transmission delay T is not less than the best transmission delay BEST_T, the method continues at step 232 where the second portion of the filtering function is performed.

At step 232, the BTS determines the difference T_DIFF between the transmission delay T and the best transmission delay BEST_T. It is desirable to filter out any samples that have a large transmission delay T with respect to the best transmission delay BEST_T. Filtering out the data samples that have a transmission delay T that is much larger than the best transmission delay BEST_T helps eliminate data samples that are skewed by an unusually large processing delay, communication error or other type of error. By removing these "bad" data samples, the method 200 can hone in on the typical transmission delay experienced between the BTS and RNC which allows the final synchronization step to synchronize the BTS to the RNC master clock that is much more accurate then prior synchronization schemes.

Thus, at step 234 the BTS determines if the calculated T_DIFF is greater than the best transmission delay BEST_T plus a maximum allowed delay difference MAX_DIFF. The actual value used for the maximum allowed delay difference MAX_DIFF is application specific and can vary from system to system. It should be apparent that every time the best transmission BEST_T is updated (step 230), the filtering function performed at step 234 is updated as well. That is, every time the BEST_T is reduced by a better transmission delay T, the best transmission delay BEST_T plus maximum allowed difference MAX_DIFF computation is also reduced. Thus, the window in which a transmission delay T must fall within to be kept as a good data sample slides to a new range every time the best transmission delay BEST_T is updated. The upper range of the window being BEST_T plus MAX_DIFF, the lower range being BEST_T. The window slides and a new range is used when BEST_T is updated with a better transmission delay T. As such, the filtering function is a sliding window filtering function. In essence, the sliding window allows the method 200 to use the minimum transmission delays experienced by the BTS and RNC. Using a sliding window and the minimum transmission delays allows the method 200 to continuously use better data samples in the synchronization process, which allows the present invention to reduce the timing error (i.e., difference in time between the BTS and RNC) to approximately 400 microseconds. A feat that prior synchronization schemes cannot achieve.

If at step 234 it is determined that the calculated T_DIFF is greater than the best transmission delay BEST_T plus the maximum allowed delay difference MAX_DIFF, then the method 200 continues at step 236. At step 236 the BTS drops the time samples obtained during the current pass and decrements the iteration loop counter N. The loop counter N is decremented at step 236 since it was incremented at step 224 (when the time samples where obtained). Once the information is dropped and the counter N is decremented, the method 200 continues at step 240, where it will determine if another iteration is required.

If, however, at step 234 it is determined that the calculated T_DIFF is not greater than the best transmission delay BEST_T plus the maximum allowed delay difference MAX_DIFF, then the method 200 continues at step 238 where the BTS adds the transmission delay T to the accumulated transmission delay ACCUM_T. The accumulated transmission delay ACCUM_T will be used to determine the average transmission delay after all of the iterations are performed. Thus, at step 240, the BTS determines if the iteration loop counter N is less than the predetermined maximum number of allowed iterations N_MAX. If it is determined that the iteration loop counter N is less than N_MAX, the method 200 continues at step 204 where another iteration is performed (as described above). If at step 240 it is determined that the iteration loop counter N is not less than N_MAX, the method 200 continues at step 242 where the BTS calculates the average transmission delay T_AVG. T_AVG is computed as follows:
3) T_AVG=ACCUM_T/N_MAX.

At step 244, the average transmission delay T_AVG is used to synchronize the BTS clock to the RNC clock. One way this can be done is to add the last transmission time SF_MCC_2 of TIMING CELL # 2 to the average transmission delay T_AVG. The result of this addition can be stored away and used as a clock base which is updated by the clock ticks obtained from the BTS clock. Since the clocks of every BTS and the RNC operate at the same rate, once the clocks are synchronized, the clocks should remain synchronized.

Thus, the present invention incorporates a sliding window filtering function into a time synchronization process. Using the sliding window allows the present invention to throw out synchronization data that is not an accurate reflection of the typical transmission delay between the clock master and the clock slave components. The present invention uses the average of the minimum transmission delays to hone in on the typical delay between the clock master and a slave component; by doing so, the present invention is able to accurately determine the time on the clock master's clock. By accurately determining the time on the clock master's clock, the present invention reduces timing errors to approximately four hundred microseconds, which is at least one order of magnitude better than prior synchronization techniques. Moreover, the present invention uses a running total of the transmission delays and an average of the accumulated delays. This allows the method of the present invention to operate in a fast and efficient manner. Since the method 200 is implemented in software, it may be ported to other wireless communications systems or to any system that requires an accurate distribution of time between components having synchronous clocks.

The method of the present invention is implemented in software and the software instructions and data can be stored in PROM, EEPROM or other non-volatile memory connected to or contained within the controller. The software used in the present invention can be stored on a hard drive, floppy disc, CD-ROM or other permanent or semi-permanent storage medium and subsequently transferred to the memory of the controller. The program embodying the method of the present invention can also be divided into program code segments, downloaded, for example, from a server computer or transmitted as a data signal embodied in a carrier wave to the controller as is known in the art.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed is:

1. A method of performing time synchronization between a clock master having a first clock and a clock slave having a second dock, said method comprising the steps of:
   (a) sending a first message to the clock master, the first message comprising information indicating a transmission time ("first transmission time") of the first message;
   (b) receiving a second message from the clock master, the second message comprising information indicating a reception time ("first reception time") of the first message and a transmission time ("second transmission time") of the second message;
   (c) obtaining at the clock slave a reception time ("second reception time") of the second message;
   (d) calculating a transmission delay between the clock slave and clock master from the first and second reception times and the first and second transmission times;
   (e) determining if the calculated transmission delay is within a time window; and
   (f) updating an accumulated delay with the calculated transmission delay if the calculated transmission delay is within the time window;
   wherein said window has a first and a second threshold, said thresholds are adjustable such that the window is a sliding window, the first threshold represents a best delay, the second threshold represents a maximum allowable difference from the best delay, and the best delay is a minimum calculated transmission delay;

and wherein said step of determining if the calculated transmission delay is within the window comprises:

determining if the calculated transmission delay is less than the best delay; and if the calculated transmission delay is less than the best delay; storing the calculated transmission delay as the undated best delay, discarding the calculated transmission delay, resetting the accumulated delay, and repeating steps (a)–(e) at least one further time.

2. The method of claim 1 further comprising repeating said steps (a)–(e) until a termination condition is met.

3. The method of claim 2 further comprising synchronizing the second clock to the first clock using the accumulated delay.

4. The method of claim 3 wherein said synchronizing step comprises:

computing an average delay from the accumulated delay; and applying the average delay as an offset to a time of the second clock.

5. The method of claim 4 wherein said average delay is computed by dividing the accumulated delay by a maximum number of times said steps (a)–(e) are to be repeated.

6. The method of claim 2 wherein said method calculates a number of times said method executes said steps (a)–(e) and terminates after said number of times equals a predefined number of times.

7. The method of claim 6 wherein said predefined number of times is twenty.

8. A method of performing time synchronization between a clock master having a first clock and a clock slave having a second clock, said method comprising the steps of:

(a) sending a first message to the clock master, the first message comprising information indicating a transmission time ("first transmission time") of the first message;

(b) receiving a second message from the clock master, the second message comprising information indicating a reception time ("first reception time") of the first message and a transmission time ("second transmission time") of the second message;

(c) obtaining at the clock slave a second reception time of the second message;

(d) calculating a transmission delay between the clock slave and clock master from the first and second reception times and the first and second transmission times;

(e) determining if the calculated transmission delay is within a time window of acceptable delays and updating an accumulated delay with the calculated transmission delay if the calculated transmission delay is within the time window;

(f) determining if said calculated transmission delay is less than a best delay, wherein the best delay represents a calculated transmission delay with a smallest delay in comparison to other calculated transmission delays; and (g) if the calculated transmission delay is less than the best delay; storing the calculated transmission delay as the updated best delay; discarding the calculated transmission delay, resetting the accumulated delay and repeating steps (a)–(f) at least one further time.

9. The method of claim 8 wherein said step of determining if the calculated transmission delay is within the window further comprises:

calculating a difference between said calculated transmission delay and the best delay;

determining if the calculated difference exceeds a maximum allowable difference; and if the calculated difference exceeds the maximum allowable difference, discarding the calculated transmission delay, and ensuring that said method executes steps (a)–(f) additional time.

10. The method of claim 8 wherein the first transmission and first reception times of the first message are generated using the second clock.

11. The method of claim 8 wherein the second transmission and second reception times of the second message are generated using the first clock.

12. The method of claim 8 wherein the first and second clocks are synchronous.

13. A method of performing time synchronization between a clock master and a clock slave, said method comprising the steps of:

a) receiving a first message from the clock slave;

(b) sending a second message to the clock slave;

(c) calculating a transmission delay between the clock slave and clock master from reception and transmission times of the first and second messages;

(d) determining if the calculated transmission delay is within a time window and updating an accumulated delay with the calculated transmission delay if the calculated transmission delay is within the time window;

(e) determining if said calculated transmission delay is less than best delay; and if the calculated transmission delay is less than the best delay; storing the calculated transmission delay as the updated best delay, discarding the calculated transmission delay, resetting the accumulated delays and repeating steps (a)–(e) at least one further time;

wherein said time window has a first and a second threshold, said thresholds are adjustable such that the window is a sliding window, the first threshold represents the best delay, the second threshold represents a maximum allowable difference from the best delay, and the best delay is a minimum calculated transmission delay.

14. The method of claim 13 further comprising repeating said until a termination condition is met.

15. The method of claim 13 further comprising synchronizing a clock of the clock slave to a clock of the clock master using the accumulated delay.

16. A method of performing time synchronization between a clock master and a clock slave, said method comprising the steps of:

(a) receiving a first message from the clock slave;

(b) sending a second message to the clock slave;

(c) calculating a transmission delay between the clock slave and clock master from reception and transmission times of the first and second messages;

(d) determining if the calculated transmission delay is within a time window and updating an accumulated delay with the calculated transmission delay if the calculated transmission delay is within the window;

(e) determining if said calculated transmission delay is less than a best delay, wherein the best delay represents a calculated transmission delay with a smallest delay in comparison to other calculated transmission delays; and (f) if the calculated transmission delay is less than the best delay, storing the calculated transmission delay as the updated best delay, discarding the calculated transmission delay, resetting the accumulated delay, and repeating steps (a)–(e) at least one further time.

17. The method of claim 16 wherein said step of determining if the calculated transmission delay is within the window further comprises:
   calculating a difference between said calculated transmission delay and the best delay;
   determining if the calculated difference exceeds a maximum allowable difference; and
   if the calculated difference exceeds the maximum allowable difference, discarding the calculated transmission delay, and ensuring that said method executes steps (a)–(e) an additional time.

18. A base station for use in a wireless telecommunications system comprising:
   a clock; and
   a controller for;
   sending a first message to a dock master of said system comprising information indicating a transmission time ("first transmission time") of the first message;
   receiving a second message from the clock master comprising information indicating a reception time ("first reception time") of the first message and a transmission time ("second transmission time") of the second message;
   obtaining a reception time ("second reception time") of the second message;
   calculating a transmission delay from the first and second reception times and the first and second transmission times;
   determining if the calculated transmission delay is within a time window and updating an accumulated delay with the calculated transmission delay if the calculated transmission delay is within the time window;
   determining if the calculated transmission delay is less than a best delay; and
   if the calculated transmission delay is less than the best delay, storing the calculated transmission delay as the best delay, discarding the calculated transmission delay, resetting the accumulated delay and re-sending the first message an additional number of times;
   wherein said time window has a first and a second threshold, said thresholds are adjustable such that the window is a sliding window, the first threshold represents the best delay, the second threshold represents a maximum allowable difference from the best delay, and the best delay is a minimum calculated transmission delay.

19. A base station for use in a wireless telecommunications system comprising:
   a clock; and
   a controller for;
   sending a first message to a clock master of said system comprising information indicating a first transmission time of the first message;
   receiving a second message from the clock master comprising information indicating a first reception time of the first message and a second transmission time of the second message;
   obtaining a second reception time of the second message;
   calculating a transmission delay from the first and second reception times and the first and second transmission times;
   determining if the calculated transmission delay is within a time window and updating an accumulated delay with the calculated transmission delay if the calculated transmission delay is within the time window;
   determining if said calculated transmission delay is less than a best delay, wherein the best delay represents a calculated transmission delay with a smallest delay in comparison to other calculated transmission delays; and
   if the calculated transmission delay is less than the best delay, storing the calculated transmission delay as the updated best delay, discarding the calculated transmission delay, resetting the accumulated delay and re-sending the first message at least one further time.

20. The base station of claim 19 wherein the controller further determines if the calculated transmission delay is within the time window by:
   calculating a difference between said calculated transmission delay and the best delay;
   determining if the calculated difference exceeds a maximum allowable difference; and
   if the calculated difference exceeds the maximum allowable difference, discarding the calculated transmission delay, and re-sending said first message an additional time.

21. The base station of claim 19 wherein the first transmission and first reception times of the first message are generated using said clock of said base station.

22. The base station of claim 19 wherein the second transmission and second reception times of the second message are generated using the clock of the clock master.

23. The base station of claim 19 wherein said controller is a programmed processor.

24. The base station of claim 19 wherein said controller is an application specific integrated circuit (ASIC).

25. The base station of claim 19 wherein said clock of said base station and the clock of the clock master are synchronous.

26. The base station of claim 19 wherein said telecommunications system is a CDMA system.

27. The base station of claim 26 wherein the clock master is a radio network controller.

28. A method for performing time synchronization between a clock master and a clock slave, said method comprising the steps of:
   (a) receiving a first message from the clock slave;
   (b) sending a second message to the clock slave;
   (c) calculating a transmission delay between the clock slave and clock master from reception and transmission times of the first and second messages;
   (d) determining if the calculated transmission delay is within a time window of acceptable delays, said window being a sliding window such that thresholds of said window are adjusted whenever a minimum calculated transmission delay is obtained;
   (e) updating an accumulated delay with the calculated transmission delay;
   (f) determining if said calculated transmission delay is less than a best delay; and
   (g) if the calculated transmission delay is less than the best delay, storing the calculated transmission delay as the updated best delay, discarding the calculated transmission delay, resetting the accumulated delay and repeating steps (a)–(f) at least one further time;
   wherein a first threshold represents the best delay and a second threshold represents a maximum allowable difference from the best delay, and wherein the best delay further represents a calculated transmission with a smallest delay in comparison to updated calculated transmission delays.

29. A method for performing time synchronization between a clock master and a clock slave, said method comprising the steps of;
(a) receiving a first message from the clock slave;
(b) sending a second message to the clock slave;
(c) calculating a transmission delay between the clock slave and clock master from reception and transmission times of the first and second messages;
(d) determining if the calculated transmission delay is within a time window of acceptable delays, said time window being a sliding window such that thresholds of said window are adjusted whenever a minimum calculated transmission delay is obtained;
(e) updating an accumulated delay with the calculated transmission delay;
(f) determining if said calculated transmission delay is less than a best delay, wherein the best delay represents a calculated transmission delay with a smallest delay in comparison to other calculated transmission delays; and
if the calculated transmission delay is less than the best delay, storing the calculated transmission delay as the best delay, discarding the calculated transmission delay, resetting the accumulated delay and repeating steps (a)–(f) at least one further time.

30. The method of claim 29 wherein said step of determining if the calculated transmission delay is within the time window further comprises:
calculating a difference between said calculated transmission delay and the best delay;
determining if the calculated difference exceeds a maximum allowable difference; and
if the calculated difference exceeds the maximum allowable difference, discarding the calculated transmission delay, and repeating steps (a)–(d) an additional time.

31. A base station for use in a wireless telecommunications system comprising:
a clock; and
a controller for;
sending a first message to a clock master of said system comprising information indicating a transmission time ("first transmission time") of the first message;
receiving a second message from the clock master comprising information indicating a reception time ("first reception time") of the first message and a transmission time ("second transmission time") of the second message;
obtaining a reception time ("second reception time") of the second message;
calculating a transmission delay from the first and second reception times and the first and second transmission times;
determining if the calculated transmission delay is within a time window of acceptable delays, said time window being a sliding window such that thresholds of said time window are adjusted whenever a minimum calculated transmission delay is obtained, and updating an accumulated delay with the calculated delay if the calculated delay is within the time window;
determining if the calculated delay is less than a best delay; and
if the calculated transmission delay is less than the best delay, storing the calculated transmission delay as the best delay, discarding the calculated transmission delay, resetting the accumulated delay and re-sending the first message an additional number of times.

* * * * *